P. J. COLLINS.
PNEUMATIC TIRE.
APPLICATION FILED DEC. 27, 1910.
1,185,986.
Patented June 6, 1916.
2 SHEETS—SHEET 1.
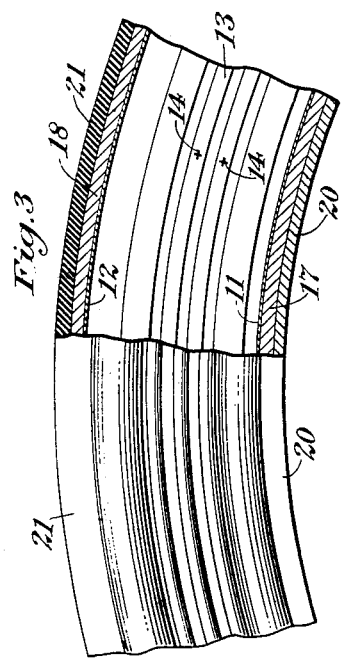
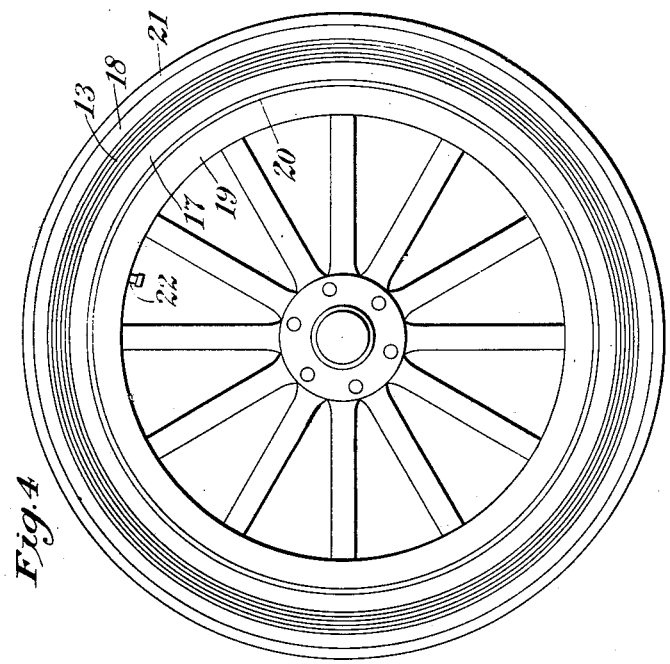
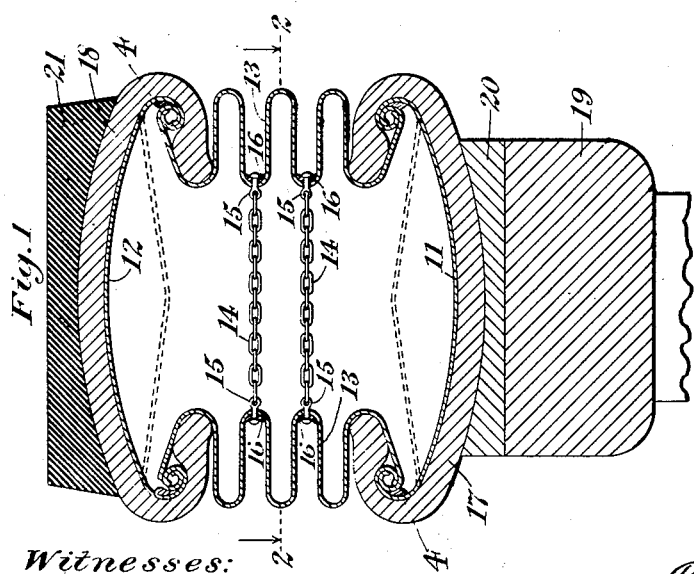
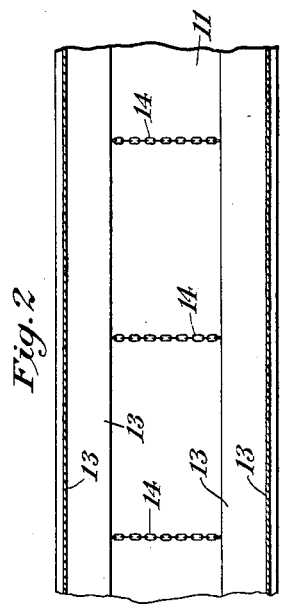
Witnesses:
Wm. Ashley Kelly
Harry Lewis
Inventor:
Peter J. Collins
by Henry D. Williams
Attorney.

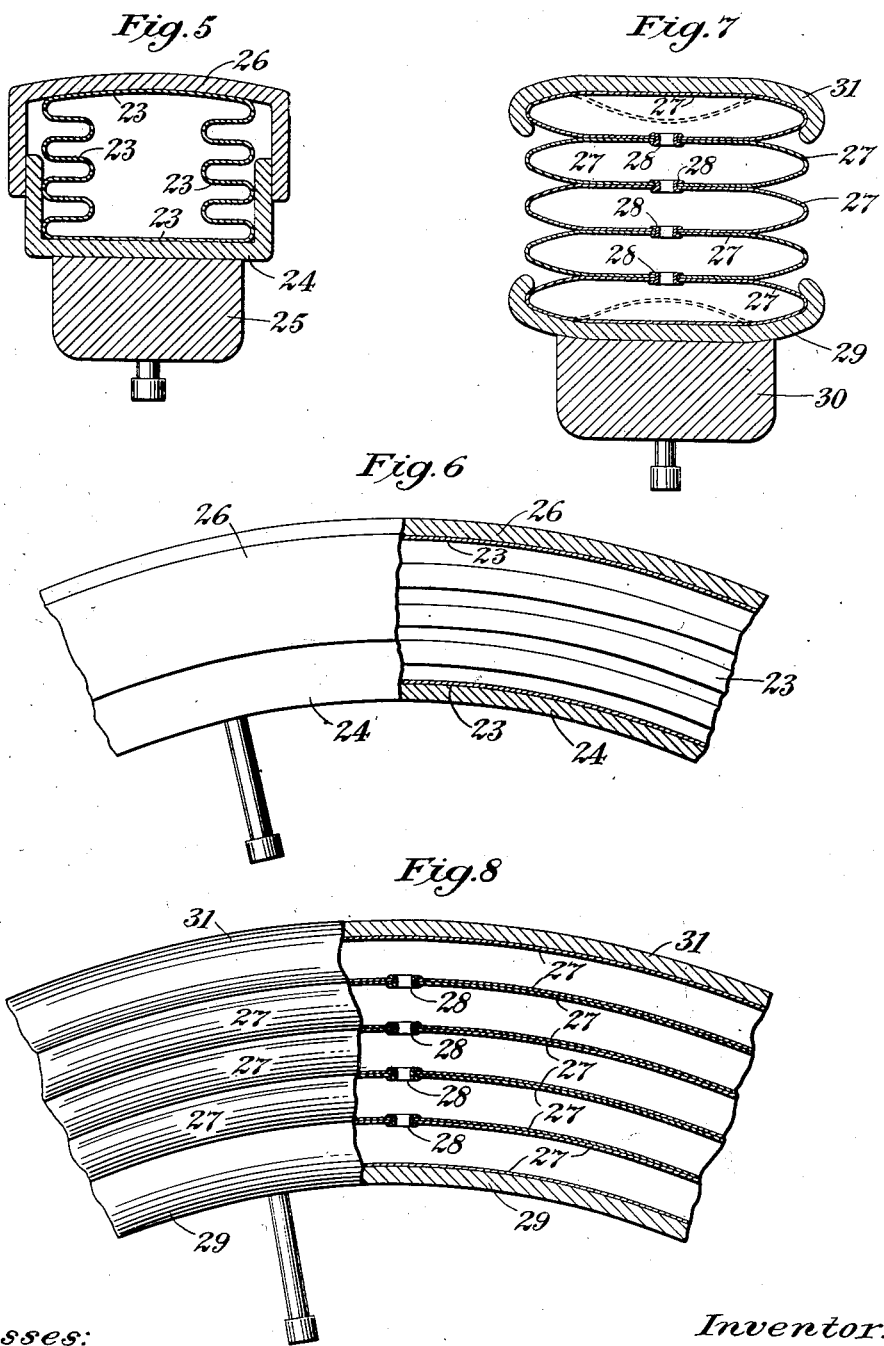

UNITED STATES PATENT OFFICE.

PETER J. COLLINS, OF NEW YORK, N. Y.

PNEUMATIC TIRE.

1,185,986.     Specification of Letters Patent.     Patented June 6, 1916.

Application filed December 27, 1910. Serial No. 599,630.

*To all whom it may concern:*

Be it known that I, PETER J. COLLINS, a citizen of the United States, residing at the borough of Brooklyn, city of New York, in the county of Kings and State of New York, have invented certain new and useful Improvements in Pneumatic Tires, of which the following is a specification, reference being had therein to the accompanying drawings, forming part thereof.

My invention relates generally to resilient vehicle tires and relates particularly to pneumatic tires.

Important objects of my invention are to increase the durability and reliability of tires, to diminish the expense of tire equipment and maintenance, and to increase the safety as well as the comfort of those riding in vehicles provided with pneumatic tires.

My invention aims to provide a metallic pneumatic tire tube which shall be highly resilient and yet of ample strength, this metallic tire tube to depend upon inflation for resiliency and to have side walls of bellows form or with annular corrugations superimposed radially, and to be capable of containing and maintaining within it by its own air tight structure, the compressed air or gas which will impart to it the pneumatic resiliency characteristic of pneumatic tires, and to be combined with means for preventing the spreading or bulging of the corrugated side walls.

My invention also includes the combination with an inflatable metallic tire tube, of a clencher rim and a continuous clencher metallic shoe, whereby the metallic tire tube is firmly held without perforation thereof and is exteriorly braced, stiffened and protected by a floating metallic hoop, and my invention includes other features of construction and various combinations of parts, as will hereinafter appear.

I shall now describe several embodiments of my invention illustrated in the accompanying drawings, and shall thereafter point out my invention in claims.

Figure 1 is a radial section of a complete pneumatic tire, wheel rim and felly. Fig. 2 is a circumferential longitudinal section of a portion of the pneumatic tire, drawn to a reduced scale, the section being taken along the line 2—2 of Fig. 1 as viewed from above. Fig. 3 is a side elevation, partly in longitudinal central vertical section, of what is shown in Figs. 1 and 2, but omitting the felly and other wheel parts and drawn to the same scale as Fig. 2. Fig. 4 is an elevation, drawn to a further reduced scale, of a wheel having my tire thereon. Fig. 5 is a radial section showing a modified pneumatic tire. Fig. 6 is a side elevation, partly in longitudinal central vertical section, of what is shown in Fig. 5, but with the felly omitted. Fig. 7 is a view similar to Fig. 5 of another modification. Fig. 8 is a view similar to Fig. 6 of the construction shown in Fig. 7.

In the embodiment of my invention illustrated in Figs. 1 to 4 inclusive of the drawings, the annular pneumatic tire tube comprises an inner wall 11, an outer wall 12 and side walls 13. These four walls are shown as separate or distinct pieces of thin sheet metal rolled together along their edges so as to form a pair of inner lateral beads and a pair of outer lateral beads, as clearly appears in Fig. 1. To additionally assure the tightness of the rolled joints, suitable packing 4, such as asbestos, may be inserted in the angles between the walls at the inside of the tube; also these joints may be electrically welded. As a means of providing proper flexibility in the tire tube, the side walls 13 are corrugated so as to provide a series of deep annular or longitudinal corrugations which are superimposed radially. These corrugations are shown as much deeper than their width and as having substantially parallel portions. For preventing the spreading or bulging of the corrugated walls 13 of the tire tube, flexible transverse ties, shown as chains 14, connect together these opposite walls. The ends of the chains 14 connect to eyes 15 which have stems passing through the walls 13 at the inwardly projecting tops of the corrugations and engaging strengthening hoops 16 at the bottoms of the annular depressions between the corrugations at the outside of the tire tube. The hoops 16 are shown as of substantially lune-shape or crescent-shape in cross section, and the attaching stems of the eyes 15 pass through holes in the hoops 16 and are upset or riveted at the outside. If necessary to render the tire tube air-tight, a drop of solder may be placed around the stem of each eye 15 where it passes through the wall 13, or the joined parts may be electrically welded.

The metallic clencher rim 17 is shown as slightly curved or dished transversely and as provided at its edges with clencher hooks terminating in beads engageable with the inner lateral beads of the tire tube and also fitting into the bottoms of the first or most radially inward of the annular depressions formed between the corrugations at the outside of the tire tube, thereby preventing bulging or spreading of the side walls 13 of the tire tube at these points. The metallic clencher shoe 18 is shown as forming a complete annulus and is of similar transverse section to the rim 17 except that the clencher hooks at its edges are turned inward instead of outward. These clencher hooks terminate in beads engageable with the outer pair of lateral beads of the tire tube and also fitting into the last or most radially outward of the annular depressions between the corrugations at the outside of the tire tube and preventing spreading or bulging of the side walls 13 of the tire tube at these points.

To facilitate the disengagement of the tire tube from the clencher hooks of the rim 17 and of the shoe 18, the inner and outer walls 11 and 12, respectively, are so shaped or bent as to have an inherent tendency or a normal bias away from the rim 17 and away from the shoe 18, respectively, at points between the clencher hooks, so that when deflated they collapse inward to positions indicated by the broken lines in Fig. 1, and thereby the tube is disengaged from the hooks of the rim and shoe. The wheel rim 17 is mounted on an ordinary felly 19, a spacing band 20 being shown as interposed between the rim and the felly and shaped to the respective contours of each. The shoe 18 is shown as provided with an annular tread band 21 which protects the shoe from wear and which if desired may be made of rubber, leather or other suitable material for deadening noise. The turned edges of the rim 17 and of the shoe 18 are shown as projecting laterally somewhat beyond the outward extensions of the corrugated walls 13 so as, in a measure, to protect these walls from wear.

The tire tube may be inflated in the usual manner through a valve-stem 22. It should be noted that the tire tube depends for its resiliency upon the resiliency of the contained air. Therefore, excepting as to the one particular of the bias of the walls for facilitating attachment or removal, resiliency in the walls of the tire tube is not a *desideratum*. Flexibility, particularly in the side walls 13, is of great importance, and for that reason the walls of the tire tube are composed of very thin flexible material, and for the same reason such tire tube is of the highly yieldable construction hereinbefore described and hereinafter claimed. The tire tube may be formed from any suitable tough, pliable sheet metal, tough rather than hard, sheet steel being one of these, also sheet copper of suitable quality and thinness, and probably several other metals and alloys.

In the modified embodiment of my invention illustrated in Figs. 5 and 6, the metallic walls of the pneumatic tire tube 23 are shown as formed integral throughout, which may be effected by integrally joining the edges of the sheet metal. A flanged metal rim 24, carried by a usual felly 25, has radial telescopic engagement with a flanged metal shoe 26. The tire tube 23 is adapted to be compressed between the rim 24 and the shoe 26, and the corrugated side walls of the tire tube 23 are prevented from spreading by the flanges of the rim 24.

In the other modified embodiment of my invention illustrated in Figs. 7 and 8, instead of the resilient annular member being composed of a single corrugated metal pneumatic tire tube, as in the hereinbefore described constructions, a plurality of radially flattened metal tubes 27 are radially superimposed and connected together to form a single resilient member. The tubes 27 are shown as presenting substantially a flattened ellipse in transverse section the flattened adjacent sides of which are in contact throughout a considerable extent at their median portions. The several tubes 27 are connected together and also placed in intercommunication by tubular rivets or eyelets 28, thereby converting these several tubes into virtually a single tire tube. If desired, the eyelet rivets 28 may be electrically welded in place. A clencher rim 29 of common form engages at its hooked edges over the lateral more sharply curved portions of the first or radially innermost of the tubes 27 and is carried by a usual felly 30. A clencher shoe 31 of the same transverse contour as the rim 30, but of course of reversed construction, similarly engages at its hooked edges over the radially outermost of the flattened tubes 27. The radially inner flattened wall of the inner tube 27 and the radially outer flattened wall of the outer tube 27 each has an inherent bias away from the rim 29 and away from the shoe 31, respectively, to thereby facilitate the detachment of the tire tube when such tube is deflated, in substantially the same manner as in the first described construction, and as indicated by the broken lines in Fig. 7.

It is obvious that various modifications may be made in the constructions shown in the drawings and above particularly described within the principle and scope of my invention.

I claim:

1. A vehicle wheel having, in combination, a rim, a shoe, an inflatable metallic tire tube consisting throughout of thin sheet metal forming a pneumatic resilient tire tube having inner and outer walls conformed respectively to the contour of the rim and the shoe and having radially expansive side walls each provided with a series of radially superimposed annular corrugations having radially disposed radially spaced concentric substantially parallel portions joined by curved portions, and a series of annularly spaced transverse ties within such inflatable tire tube flexibly connecting one of the inwardly curved portions of the radial corrugations of one of the radially disposed radially expansive side walls with the corresponding one of the inwardly curved portions of the radial corrugations of the other radially disposed radially expansive side wall to prevent the bulging of these side walls by reason of the inflation of the tire tube.

2. A vehicle wheel having, in combination, a rim, a shoe, an annular inflatable metallic tube located between the rim and the shoe, such tube having in each of its sides a series of annular corrugations superimposed radially, strengthening hoops at the bottoms of the annular depressions between the corrugations at the outside of such tube, and transverse ties within such tube connecting the hoops at opposite sides of the tube.

3. A vehicle wheel having, in combination, a clencher rim having tire-engaging clencher hooks, a continuous metallic clencher shoe having inwardly-turned tire-engaging clencher hooks, an inflatable metallic tire tube consisting throughout of thin sheet metal forming a pneumatic resilient tire tube having inner and outer walls conformed respectively to the contour of the rim and the shoe and having radially expansive side walls, such metallic inflatable tire tube having portions engageable by the clencher hooks of the clencher rim and having other portions engageable by the clencher hooks of the clencher shoe.

4. A vehicle wheel having, in combination, an inflatable metallic tire tube forming a pneumatic resilient tire having in each of its sides a series of annular corrugations superimposed radially and provided with a pair of lateral beads radially inward from the corrugations and another pair of lateral beads radially outward from the corrugations, a clencher rim having hooked edges engageable with the inner beads, a metallic clencher shoe having hooked edges engageable with the outer beads, and ties within the tire tube connecting the opposite corrugated walls thereof.

5. A vehicle wheel having, in combination, a metallic pneumatic tire tube having in each of its sides a series of annular corrugations superimposed radially and provided with a pair of lateral beads radially inward from the corrugations and another pair of lateral beads radially outward from the corrugations, a clencher rim having hooked edges engageable with the inner beads, a metallic clencher shoe having hooked edges engageable with the outer beads, strengthening hoops at the bottoms of the depressions between the corrugations at the outside of the tire tube, and transverse ties within the tire tube connecting the hoops at opposite sides of the tire.

6. A vehicle wheel having, in combination, a metallic pneumatic tire tube having in each of its sides a series of annular corrugations superimposed radially and provided with a pair of lateral beads radially inward from the corrugations and another pair of lateral beads radially outward from the corrugations, a clencher rim having clencher hooks engageable with the inner beads of the tire tube and fitting into the bottom of the adjacent depressions between the corrugations, and a metallic clencher shoe having clencher hooks engageable with the outer beads of the tire tube and fitting into the bottoms of the adjacent depressions between the corrugations.

7. A vehicle wheel having, in combination, an inflatable metallic tire tube forming a pneumatic tire having in each of its sides a series of annular corrugations superimposed radially, a clencher rim having clencher hooks entering the most radially inward of the annular depressions between the corrugations at the outside of the tube and pressing against the bottoms thereof, a metallic clencher shoe having clencher hooks entering the most radially outward of the annular depressions between the corrugations at the outside of the tube and pressing against the bottoms thereof, strengthening hoops at the bottoms of other of the depressions at the outside of the tube, and transverse ties within the tube connecting the hoops at opposite sides of the tube.

8. An inflatable metallic tire tube comprising an inner wall, an outer wall, and side walls having therein series of corrugations superimposed radially, each of the walls being a separate piece, these separate pieces having their adjacent margins rolled together.

9. An inflatable metallic tire tube comprising a plurality of annular strips of sheet metal having their adjacent margins rolled together to form the pneumatic tire tube.

10. An inflatable metallic tire tube comprising a plurality of annular strips of sheet metal having their adjacent margins rolled together and being shaped and arranged to form an inner wall and an outer wall joined by annular radially expansive side walls.

11. A vehicle wheel having, in combination, a rim, a shoe, an inflatable metallic tire tube consisting throughout of thin sheet metal forming a pneumatic resilient tire tube having inner and outer walls conformed respectively to the contour of the rim and the shoe and having radially expansive side walls made up of radially spaced concentric substantially parallel portions of greater width than the distance of radial spacing between such portions, such spaced parallel portions being joined by curved portions to provide a plurality of annular corrugations superimposed radially and of greater depth than width, and restraining means for the radially disposed radially expansive side walls to restrain the bulging of these side walls by reason of the inflation of the tire tube.

12. A vehicle wheel having, in combination, a rim, a shoe, an inflatable metallic tire tube consisting throughout of thin sheet metal forming a pneumatic resilient tire tube having inner and outer walls conformed respectively to the contour of the rim and the shoe and having radially expansive side walls made up of radially spaced concentric substantially parallel portions of greater width than the distance of radial spacing between such portions, such spaced parallel portions being joined by curved portions to provide a series of annular corrugations superimposed radially and of greater depth than width, and a series of annularly spaced transverse ties within such inflatable tire tube flexibly connecting the inwardly curved portions of the radial corrugations of one of the radially disposed radially expansive side walls with the similar inwardly curved portions of the radial corrugations of the other radially disposed radially expansive side wall to prevent the bulging of these side walls by reason of the inflation of the tire tube.

13. A vehicle wheel having, in combination, a rim, a shoe, an inflatable metallic tire tube consisting throughout of thin sheet metal forming a pneumatic resilient tire tube having inner and outer walls conformed respectively to the contour of the rim and the shoe and having radially expansive side walls each provided with a series of radially superimposed annular corrugations having radially disposed radially spaced concentric substantially parallel portions joined by curved portions, and a plurality of series of annularly spaced transverse ties within such inflatable tire tube flexibly connecting a corresponding plurality of the inwardly curved portions of the radial corrugations of one of the radially disposed radially expansive side walls with the corresponding plurality of inwardly curved portions of the radial corrugations of the other radially disposed radially expansive side wall to prevent the bulging of these side walls by reason of the inflation of the tire tube.

In testimony whereof I have affixed my signature in presence of two witnesses.

PETER J. COLLINS.

Witnesses:
WM. ASHLEY KELLY,
BERNARD COWEN.